United States Patent
Care

(10) Patent No.: US 8,263,212 B2
(45) Date of Patent: Sep. 11, 2012

(54) COMPOSITE MATERIAL REPAIR

(75) Inventor: Ian C. D. Care, Derby (GB)

(73) Assignee: Rolls-Royce PLC, London (GB)

( * ) Notice: Subject to any disclaimer, the term of this patent is extended or adjusted under 35 U.S.C. 154(b) by 826 days.

(21) Appl. No.: 12/285,347

(22) Filed: Oct. 2, 2008

(65) Prior Publication Data
US 2010/0047541 A1 Feb. 25, 2010

(30) Foreign Application Priority Data

Nov. 1, 2007 (GB) .................................. 0721546.0

(51) Int. Cl.
B32B 7/04 (2006.01)
B32B 3/14 (2006.01)
B32B 43/00 (2006.01)

(52) U.S. Cl. ............... 428/212; 428/63; 428/60; 156/94

(58) Field of Classification Search .................. None
See application file for complete search history.

(56) References Cited

U.S. PATENT DOCUMENTS

| | | | | |
|---|---|---|---|---|
| 3,508,754 A | * | 4/1970 | Shorin | 273/139 |
| 4,517,038 A | * | 5/1985 | Miller | 156/98 |
| 4,916,880 A | | 4/1990 | Westerman, Jr. | |
| 5,190,611 A | * | 3/1993 | Cologna et al. | 156/98 |
| 5,626,934 A | * | 5/1997 | Brewer | 428/63 |
| 5,882,756 A | | 3/1999 | Alston et al. | |

FOREIGN PATENT DOCUMENTS

| | | |
|---|---|---|
| DE | 28 01 637 A1 | 7/1979 |
| DE | 199 43 751 A1 | 3/2001 |
| JP | A-2004-55018 | 2/2004 |

OTHER PUBLICATIONS

Yap et al. "The analysis of skin-to-stiffener debonding in aerospace structures". Composite Structures, 57, (2002); pp. 425-435.*

Jun. 6, 2012 European Search Report issued in European Application No. EP 08 25 3206.

* cited by examiner

*Primary Examiner* — David R Sample
*Assistant Examiner* — Prashant J Khatri
(74) *Attorney, Agent, or Firm* — Oliff & Berridge, PLC

(57) ABSTRACT

A repaired composite material component 24 comprises parent composite material 12, a primary region 14 of replacement composite material and a secondary region 26 of replacement composite material which has a greater tendency to debond under loading of the repaired composite material component 24 than the primary region 14.

15 Claims, 3 Drawing Sheets

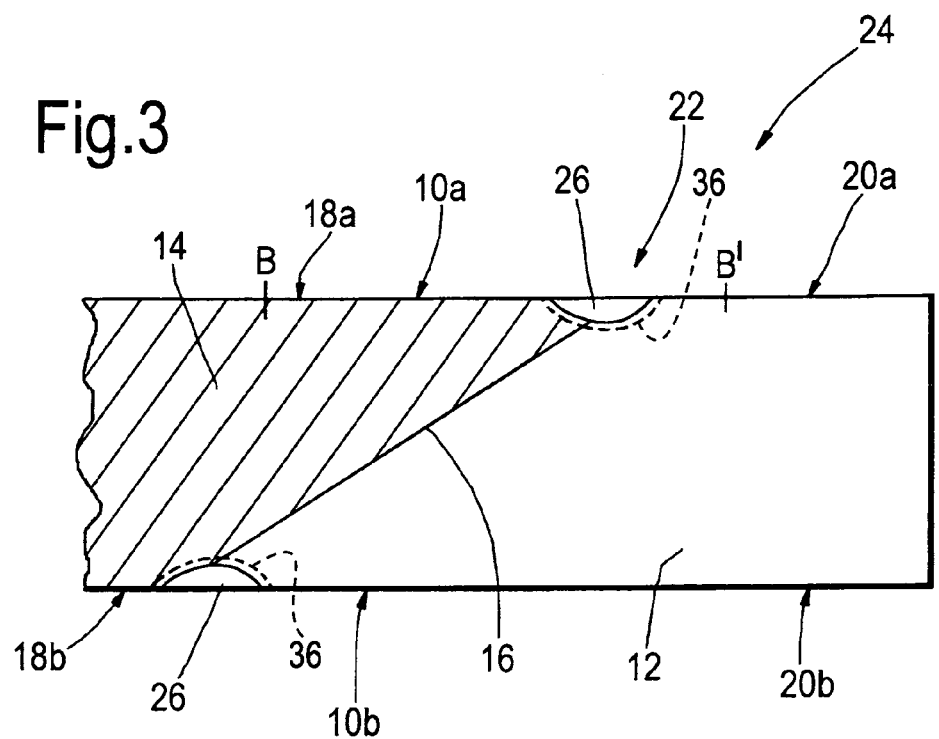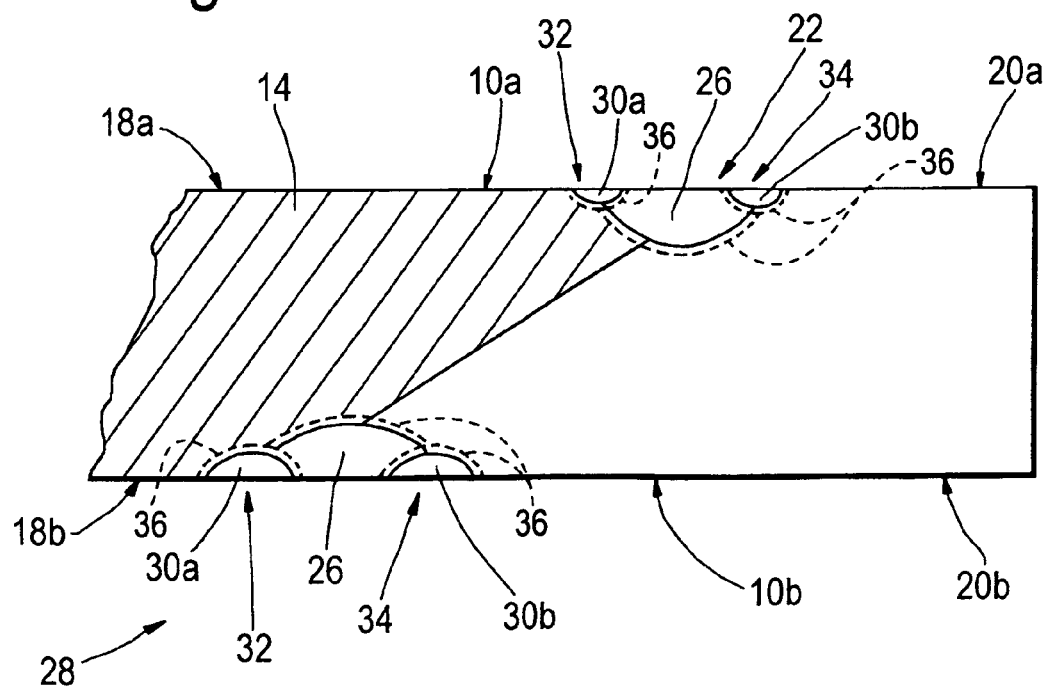

ent composite material components, and more particularly to a repaired composite material component and to a method for repairing a composite material component.

COMPOSITE MATERIAL REPAIR

The present invention relates generally to the repair of composite material components, and more particularly to a repaired composite material component and to a method for repairing a composite material component.

Components formed of composite materials can be damaged during use and various methods for repairing damaged composite material components are presently available. One such method comprises removing damaged composite material from the component, shaping the remaining undamaged parent composite material and inserting and bonding in place replacement composite material.

The junctions or interfaces at which the replacement composite material is bonded to the parent composite material can act as stress concentrators, thus increasing the risk of failure of the repaired composite material component due to crack initiation at these junctions or interfaces. Also, where the component is an aerofoil, it cannot usually be repaired by adding material to the aerofoil surfaces as the aerodynamic performance of the surfaces is adversely affected.

According to the invention, there is provided a repaired composite material component and a method for repairing a composite material component as set out in the independent claims.

Embodiments of the invention will now be described by way of example only and with reference to the accompanying drawings, in which:

FIG. 3 is an enlarged diagrammatic cross-sectional view of part of a repaired composite material component according to one embodiment of the invention; and FIG. 4 is an enlarged diagrammatic cross-sectional view of part of a repaired composite material component according to another embodiment of the invention.

Figure 1A:
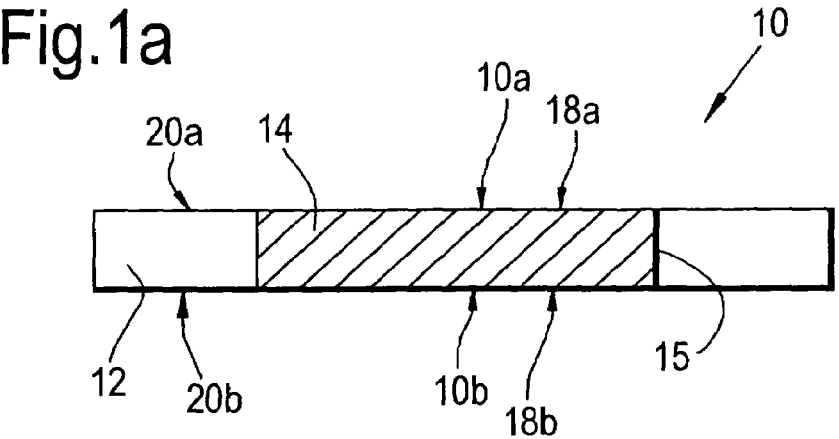
FIGS. 1a to 1c are diagrammatic cross-sectional views of different arrangements of a prior art repaired composite material component.

Referring initially to FIGS. 1a to 1c and 2a, there are shown different arrangements of a known repaired composite material component 10, 110, 210 comprising parent composite material 12 and a primary region 14 of replacement composite material. The primary region 14 of replacement composite material is identified by hatched lines in FIGS. 1a to 1c and 2a and in the subsequent drawings. The repaired composite material component 10, 110, 210 comprises first and second outer surfaces 10a, 10b, and where the repaired composite material component 10, 110, 210 is an aerofoil, the first outer surface 10a is typically the pressure surface and the second outer surface 10b is typically the suction surface.

In order to form the repaired composite material component 10, 110, 210, damaged composite material is initially removed from the original composite material component to form a void in the remaining undamaged parent composite material 12 and the parent composite material is then shaped to form a void in which replacement composite material can be located, the void defining an edge 15, 16 which acts as an interface at which a secure joint can be formed between the parent composite material 12 and the primary region 14 of replacement composite material, for example during curing of the primary region 14 of replacement composite material to bond it to the parent composite material 12.

In the arrangement shown in FIG. 1a, the parent composite material is shaped to form a void having an edge 15 which is orthogonal to the outer surfaces 10a, 10b and which extends fully through the thickness of the parent composite material 12.

Figure 1B:
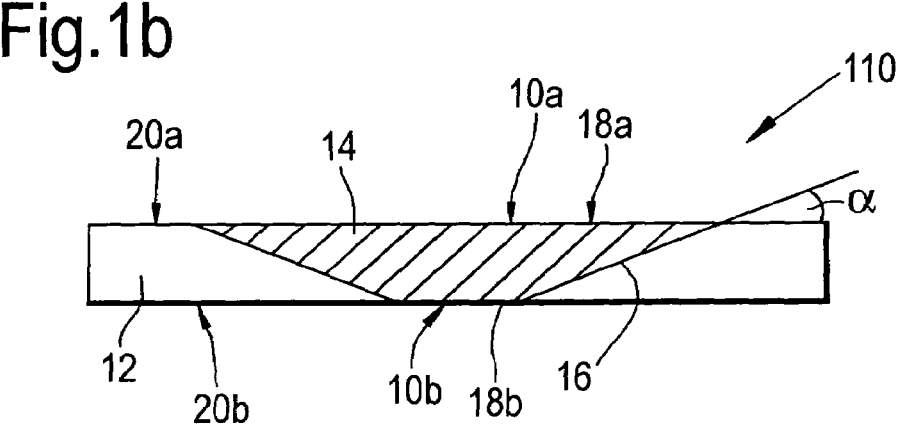
Figure 1C:
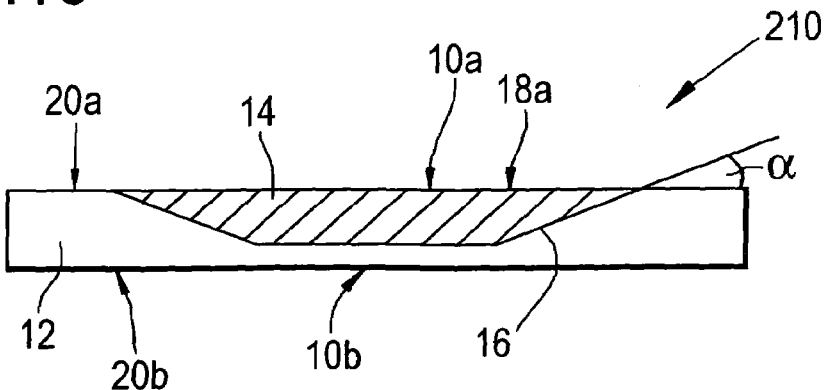

In the arrangements shown in FIGS. 1b and 1c, the parent composite material 12 is shaped to form a void having a circumferential sloping or 'scarfed' edge 16. In the arrangement of FIG. 1b, the void extends fully through the thickness of the parent composite material; whilst in the arrangement of FIG. 1c, the void extends only partially through the thickness. The use of an arrangement having a sloping edge 16, such as that illustrated in FIG. 1b or FIG. 1c, may be beneficial where the repaired composite material component 10 is an aerofoil whose outer surface 10a acts as the pressure surface.

Figure 2A:
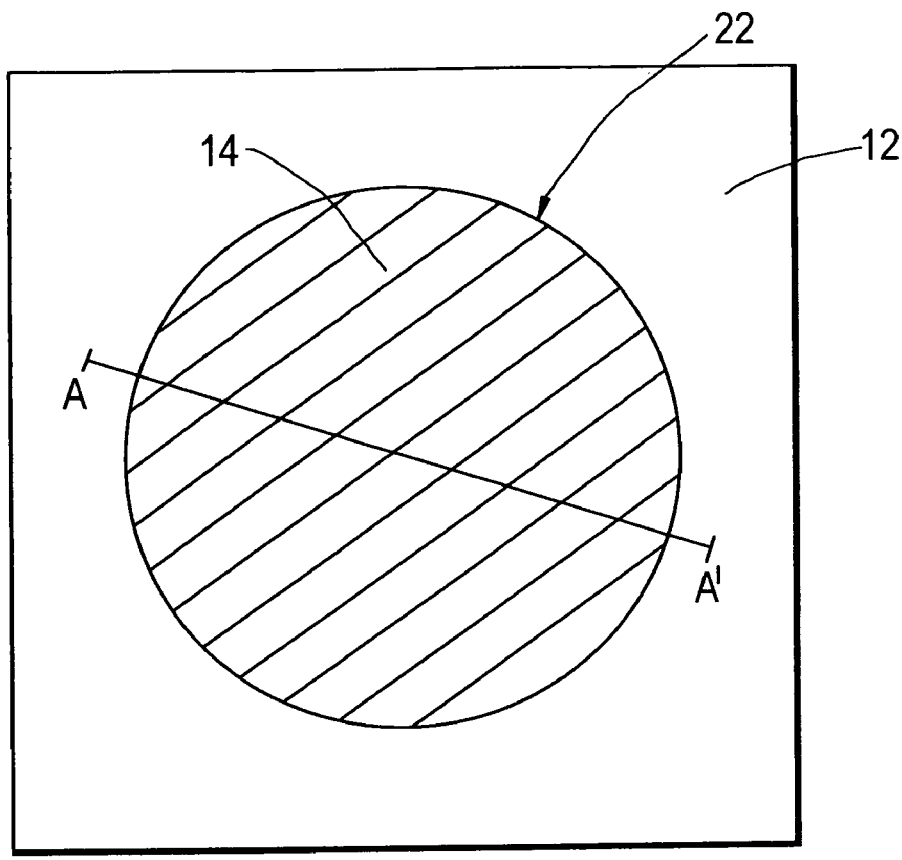
FIG. 2a is a diagrammatic plan view of the repaired composite material components of FIGS. 1a to 1c.

Whilst the void, and hence the junction between the parent composite material 12 and the primary region 14 of replacement composite material, is shown in FIG. 2a as being circular in plan, it may equally well be of a different shape. What is important is that the shape has substantially smooth edges, with no sharp features or corners that may act as stress raisers.

With the arrangements of FIGS. 1b and 1c, it is desirable to optimise the scarf angle ($\alpha$) of the edge 16 as this typically affects the ability of the repaired composite material component 110, 210 to withstand shear and torsional loads without failure. In particular, minimisation of the scarf angle ($\alpha$) enables the repaired composite material component 10 to withstand greater shear and torsional loads without debonding of the primary region 14 of replacement composite material from the parent composite material 12.

In the arrangements shown in FIGS. 1a to 1c, the exposed outer surfaces 18a, 18b of the primary region 14 of replacement composite material and the respective adjacent exposed outer surfaces 20a, 20b of the parent composite material 12 are arranged to define substantially smooth and continuous first and second outer surfaces 10a, 10b. This is desirable particularly where air or water or other fluid flows over the exposed outer surfaces of the repaired composite material component 10, 110, 210 during use, for example where the repaired composite material component 10, 110, 210 is used as an aerofoil component in a gas turbine engine. If the first and second outer surfaces 10a, 10b were not substantially smooth and continuous, fluid flow across the exposed outer surfaces of the repaired component 10, 110, 210 may be adversely affected.

Figure 2B:
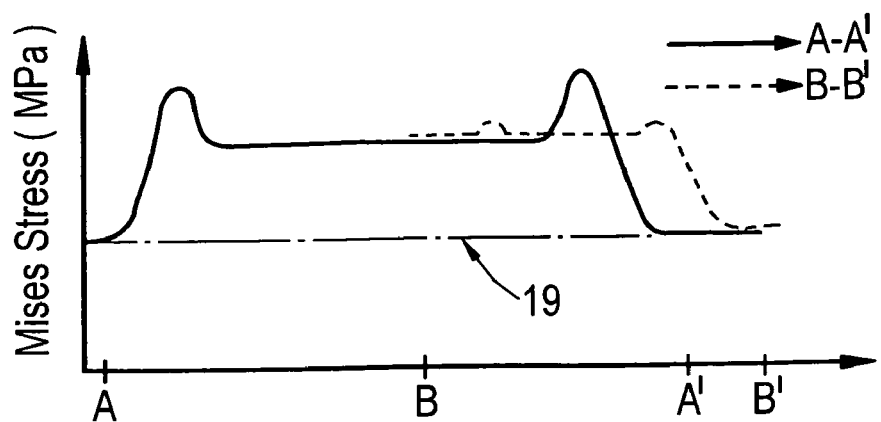
FIG. 2b is a an illustration of the Mises stress along the line A-A' of FIG. 2a and B-B' of FIG. 3.

Referring now to FIG. 2b, the line 19 indicates the level of the Mises stress for an "ideal" and perfectly original region of material 12 containing no damage or repair. The solid line indicates the Mises stress along the line A-A' of FIG. 2a. It is evident that the junction 22 between the parent composite material 12 and the primary region 14, adjacent their respective exposed outer surfaces 20a, 18a, acts as a stress concentrator at which peak stress is experienced. The stress in the primary region 14 is higher than in the "ideal" material, but not as high as at the peaks corresponding to the junction 22. In practice, as the scarf angle $\alpha$ increases, the levels of stress tend to increase both in the primary region 14 and at the peaks. Because of this stress concentration, failure of the repaired composite material component 10, 110, 210 under loading in use may typically occur as a result of crack initiation at the junction 22. In the event of crack initiation, the crack typically propagates from the junction 22 along the edge 16 resulting in debonding of the primary region 14 from the parent composite material 12, and where the repaired composite material component 10, 110, 210 is an aerofoil, the exposed outer surfaces 18a, 20a will generally experience higher external pressure than the exposed outer surfaces 18b, 20b. There may be no visible warning of such crack initiation/propagation until the primary region 14 has fully debonded from the parent composite material 12, and this is undesirable as it can result in dramatic failure of the repaired composite material component 10, 110, 210.

Referring now to FIG. 3, there is shown an enlarged view of part of a repaired composite material component 24 according to one embodiment of the invention. The repaired composite material component 24 shares many features in common with the component 110 illustrated in FIGS. 1b and 2a, and accordingly corresponding features are designated using corresponding reference numerals.

The repaired composite material component 24 comprises, in addition to the primary region 14 of replacement composite material, secondary regions 26 of replacement composite material.

In more detail, the secondary regions 26 of replacement composite material are provided at the circumferentially extending junction 22 between the parent composite material 12 and the primary region 14 of replacement composite material on both the first and second outer surfaces 10a, 10b, to replace part of the parent composite material 12 and part of the primary region 14 of replacement composite material. For example, annular grooves may be formed partly in the parent composite material 12 and partly in the primary region 14 of replacement composite material at the adjacent exposed outer surfaces 18a, 20a, 18b, 20b of the first and second outer surfaces 10a, 10b. Replacement composite material may then be located in the annular grooves to form annular secondary regions 26 of replacement composite material.

In accordance with embodiments of the invention, the secondary regions 26 of replacement composite material have a greater tendency to debond, under extreme loading of the repaired composite material component 24, than the primary region 14 of replacement composite material. As shown in FIG. 2b by the plot of surface stress along the line B-B' of FIG. 3, this is because the maximum stresses occur at the interfaces between the parent composite material 12 and primary region 14 of replacement composite material 14 on the one hand and the secondary region 26 of replacement composite material on the other hand. It will also be appreciated from FIG. 2b that the peak stresses are reduced by the provision of the secondary region 26 of replacement composite material.

Thus, in the event of crack initiation, the initiated crack will tend to propagate along the interface 16 between one or both of the secondary regions 26 of replacement composite material and the adjacent composite material, namely the parent composite material 12 or the primary region 14 of replacement composite material. The secondary regions 26 of replacement composite material thus act as 'sacrificial repairs' which have a greater tendency to fail due to debonding than the main repair provided by the primary region 14 of replacement composite material.

Debonding of the secondary regions 26 due to crack initiation and propagation provides a visual indication that there is a problem with the repaired composite material component 24, and in particular provides an indication that the component 24 may no longer be structurally sound and therefore may not be fit for continued use.

The provision of the secondary regions 26 also acts to reduce the stress concentration at the annular junction 22 on the first and second outer surfaces 10a, 10b, thus reducing the likelihood of crack initiation under loading of the repaired composite material component 24.

Whilst FIG. 3 shows a repaired composite material component 24 in which secondary regions 26 of replacement composite material have been provided at the junctions 22 on both the first and second outer surfaces 10a, 10b, a secondary region 26 could be provided at the junction 22 on only one of the first and second outer surfaces 10a, 10b.

Referring now to FIG. 4, there is shown an enlarged view of part of a repaired composite material component 28 according to another embodiment of the invention. The repaired composite material component 28 is similar to the repaired composite material component 24 shown in FIG. 3, and thus shares many features in common with the component 24 illustrated in FIG. 3 and the component 110 illustrated in FIGS. 1b and 2a, which are accordingly designated using corresponding reference numerals The repaired composite material component 28 comprises tertiary regions 30a, 30b of replacement composite material. The tertiary regions 30a are provided at a junction 32 between the parent composite material 12 and the secondary region 26 on both the first and second outer surfaces 10a, 10b and the tertiary regions 30b are provided at a junction 34 between the primary region 14 of replacement composite material and the secondary region 26 on both the first and second outer surfaces 10a, 10b. It will of course be appreciated that if a secondary region 26 of replacement composite material is provided on only one of the first and second outer surfaces 10a, 10b, tertiary regions 30a, 30b will likewise only be provided on the corresponding first or second outer surface 10a, 10b.

Both of the tertiary regions 30a, 30b of replacement composite material have a greater tendency to debond than the secondary region 26 of replacement composite material under loading of the repaired composite material component 28. Thus, in the event of crack initiation, the initiated crack will tend to propagate along the interface between a tertiary region 30a, 30b of replacement composite material and the adjacent composite material Debonding of a tertiary region 30a, 30b due to crack initiation and propagation provides a visual indication that there is a problem with the repaired composite material component 28, and in particular provides an indication that the component 28 may no longer be structurally sound and therefore may not be fit for continued use.

The provision of the tertiary regions 30a, 30b also acts to reduce the stress concentration at the junctions 32, 34, thus reducing the likelihood of crack initiation under loading of the repaired composite material component 28.

In embodiments of the invention, indicator means 36 (which is illustrated diagrammatically in FIGS. 3 and 4 by broken lines) may be provided in a region underlying the secondary and/or tertiary regions 26, 30a, 30b of replacement composite material, at an interface between the respective region and the adjacent composite material, to provide an indication that debonding has occurred. The indicator means 36 may, for example, comprise a visual indicator means such as suitably coloured substrate and/or suitably coloured adhesive.

Although embodiments of the invention have been described in the preceding paragraphs with reference to various examples, it should be appreciated that various modifications to the examples given may be made without departing from the scope of the present invention, as claimed. For example, any suitable number of secondary regions 26 and/or tertiary regions 30a, 30b of replacement composite material may be provided. The primary, secondary and tertiary regions 14, 26, 30a, 30b of replacement composite material may be of any suitable shape or configuration.

Although the first and second outer surfaces 10a, 10b are planar in the illustrated embodiments, either one or both of the first and second outer surfaces 10a, 10b may be curved.

Although surfaces 10a and 10b are shown as parallel in FIGS. 3 and 4, they need not be—in which case the scarf angle α may be chosen to be optimal for each surface. This may mean that the scarf angle α will be different at the two surfaces 10a and 10b, so that the interface 16 will no longer be a straight line, as shown in FIGS. 3 and 4, but will be curved or of some other shape.

I claim:

1. A repaired composite material component comprising:
    parent composite material;
    a primary region of replacement composite material to replace damaged composite material; and
    a secondary region of replacement composite material having a greater tendency to debond under loading of the repaired composite material component than the primary region,
    wherein the primary region is coextensive with the secondary region and the secondary region of replacement composite material is provided at a junction between the primary region and the parent composite material, and overlaps and replaces at least a portion of the primary region and the parent composite region.

2. The component according to claim 1, wherein junctions are present between the primary region and the parent composite material on first and second outer surfaces of the repaired composite material component and a secondary region of replacement composite material is provided at both junctions.

3. The component according claim 1, wherein the primary region of replacement composite material is generally circular in plan and the secondary region is generally annular, extending circumferentially around an annular junction between the primary region and the parent composite material.

4. The component according to claim 1, wherein the repaired composite material component comprises one or more tertiary regions of replacement composite material, the or each tertiary region of replacement composite material having a greater tendency to debond under loading of the repaired composite material component than the secondary region.

5. The component according to claim 4, wherein the or each tertiary region of replacement composite material is provided at a junction between the secondary region and the parent composite material.

6. The component according to claim 5, wherein junctions are present between the secondary region and the parent composite material on first and second outer surfaces of the repaired composite material component and a tertiary region of replacement composite material is provided at both junctions.

7. The component according to claim 4, wherein the or each tertiary region of replacement composite material is provided at a junction between the secondary region and the primary region of replacement composite material.

8. The component according to claim 7, wherein junctions are present between the secondary region and the primary region of replacement composite material on first and second outer surfaces of the repaired composite material component and a tertiary region of replacement composite material is provided at both junctions.

9. The component according to claim 4, wherein the repaired composite material component includes indicator means for providing an indication of debonding of the secondary region and/or the or each tertiary region of replacement composite material.

10. The component according to claim 9, wherein the indicator means is provided in an area underlying the secondary region and/or the or each tertiary region.

11. The component according to claim 10, wherein a first indicator means is provided underlying the or each secondary region and a second different indicator means is provided underlying the or each tertiary region.

12. A method for repairing a composite material component comprising:
    providing a parent composite material;
    providing a primary region of replacement composite material to replace damaged composite material; and
    providing a secondary region of replacement composite material having a greater tendency to debond under loading of the repaired composite material component than the primary region,
    wherein the primary region is coextensive with the secondary region and the secondary region of replacement composite material is provided at a junction between the parent composite material and the primary region of replacement composite material, the secondary region of replacement material overlapping and replacing at least a portion of the primary region and the parent composite material.

13. The method according to claims 12, wherein the method comprises providing one or more tertiary regions of replacement composite material, the or each tertiary region of replacement composite material having a greater tendency to debond under loading of the repaired composite material component than the secondary region.

14. The method according to claim 12, wherein the method comprises providing an indicator means to provide an indication of debonding of the secondary region and/or the or each tertiary region of replacement composite material.

15. The method according to claim 14, wherein the method comprises providing the indicator means in an area underlying the secondary region and/or the or each tertiary region.

* * * * *